United States Patent
Urh et al.

(10) Patent No.: US 8,572,547 B1
(45) Date of Patent: Oct. 29, 2013

(54) SYSTEMS AND METHODS FOR A DEVELOPMENT ENVIRONMENT

(75) Inventors: Joseph Matthew Urh, San Antonio, TX (US); Aaron David Bos, Helotes, TX (US); Brett Gary Pittman, San Antonio, TX (US); Michael Scott McQuarrie, San Antonio, TX (US); Ronnie Allen Eichler, San Antonio, TX (US); Jose Luis Rodriguez, Helotes, TX (US); Ronald M. Schekman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1694 days.

(21) Appl. No.: 11/744,511

(22) Filed: May 4, 2007

(51) Int. Cl.
*G06F 9/44* (2006.01)

(52) U.S. Cl.
USPC ........................................................ 717/100

(58) Field of Classification Search
None
See application file for complete search history.

(56) References Cited

U.S. PATENT DOCUMENTS

| | | | |
|---|---|---|---|
| 2002/0073313 A1* | 6/2002 | Brown et al. | 713/165 |
| 2004/0230841 A1* | 11/2004 | Savini | 713/202 |
| 2004/0261053 A1* | 12/2004 | Dougherty et al. | 717/101 |

OTHER PUBLICATIONS

Bacarella, M., "The Peon's Guide to Secure System Development," *Netgraft Corp.*, http://m.bacarella.com/papers/secsoft/html, 2002, downloaded May 3, 2007, 8 pages.
Corsaire Limited, "Creating a Secure Development Framework," http://www.informit.com/articles/printerfriendly.asp?p=175931&rl=1, 2004, downloaded May 3, 2007, 7 pages.
Hardin, D. et al., "Secure, High-Assurance Development Environment (SHADE) Program," *Advanced Computing Systems, Rockwell Collins*, 2005, downloaded May 3, 2007, 1-12.
Sparta, Inc., "Information System Security Operation: Secure Protected Development Repository: Supporting Trust in Development Environments & Protecting Critical Software Assets," *Data Sheet*, downloaded May 3, 2007, 2 pages.

* cited by examiner

*Primary Examiner* — Wei Zhen
*Assistant Examiner* — Lanny Ung
(74) *Attorney, Agent, or Firm* — Brooks, Cameron & Huebsch, PLLC (57) ABSTRACT

A developer zone is provided for use by developers. A method for providing a developer zone may include receiving a request, initializing a provisional computing device, initializing a development computing device, copying data to the provisional computing device, then to the development computing device. A method for providing a developer zone may include copying data from a secured computing device to a provisional computing device, initializing a development computing device, loading at least a portion of the copied data from the provisional computing device to the development computing device, and developing a software package on the development computing device. Using a developer zone may include logging into a terminal server, requesting a copy of at least a portion of secured data, wherein the portion of secured data is first copied onto a provisional computing device and then loaded onto the development computing device, and inputting instructions at the terminal server.

21 Claims, 7 Drawing Sheets

SYSTEMS AND METHODS FOR A DEVELOPMENT ENVIRONMENT

BACKGROUND

Organizations typically create a secure computing environment to create, test, and run programs using secured source code. A secure or protected computing environment may be necessary because during the creation and testing phase, sensitive information such as protected source code and systems such as protected servers may be exposed to the developer. If a developer has access to these protected resources, there exists the possibility that malicious or destructive code may be introduced into the organization's systems that may hinder or completely halt business operations as well as release confidential information to unknown sources. The threat of exposure is an issue because organizations may use outside resources to develop, test, and implement computing programs. These outside resources, which may not have the same level of controls placed upon inside resources, may include developers as well as third party commercial off-the-shelf software packages (COTS).

SUMMARY

A developer zone is provided for use by developers, the zone having copies of secured data. An example embodiment may include receiving a request from an unsecured computing device, initializing a provisional computing device, initializing a development computing device, copying the data from the secured production computing device to the provisional computing device, and copying the data from the provisional computing device to the development computing device. Another example embodiment may include copying data from a secured computing device to a provisional computing device, initializing a development computing device, loading at least a portion of the copied data from the provisional computing device to the development computing device, and developing a software package on the development computing device. Another embodiment may include logging into a terminal server via a remote terminal, requesting from a secured computing system that a copy of at least a portion of secured data be loaded onto a development computing device, wherein the portion of secured data is first copied onto a provisional computing device and then loaded onto the development computing device, and inputting instructions at the terminal server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

The subject matter of the described embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. Finally, the communication configuration between computing resources in the following figures are meant to be only illustrative.

As discussed above, when using resources outside of the control of an organization, there may be a threat of exposing secured, or protected, computing resources to the unsecured, or unprotected, computing environment. To minimize or reduce the threat level, an organization may limit the access developers operating in unsecured computing environments have to secure computing environments. The largest reduction may be realized if, through the use of various firewalls or other communication barriers, the outside developer has no access to the secure computing environment.

Although a complete removal of access to a secure computing environment may obviate a potential threat, to develop software packages for their customer, a developer may need access to resources, including the current production source code version as well as the current production environment, to write and test relevant software packages in an efficient manner. To accommodate the need of developers to work efficiently, while also protecting secured resources, an organization may provide access to the developer working in an unsecured computing environment in a limited manner while still protecting secured resources.

In one exemplary and non-limiting example, the organization may create a virtual development environment that simulates the secured operating environment. In the virtual development environment, the organization preferably controls, among other things, the information and data going into the virtual environment, the access of the developer while using the virtual environment, as well as data and information exiting the virtual environment. The virtual environment, although not protected to the level of the secured operating environment, may also be considered a protected or secured environment. The virtual environment may be considered protected or secured because the organization will preferably establish operating guidelines as well as system configurations for resources within the virtual environment that limit what resources or data the developer may have access to as well as what the developer may do with the resources or data the developer does have access to. The virtual development environment is termed and used in the description of the figures below as a "developer zone".

Figure 1:
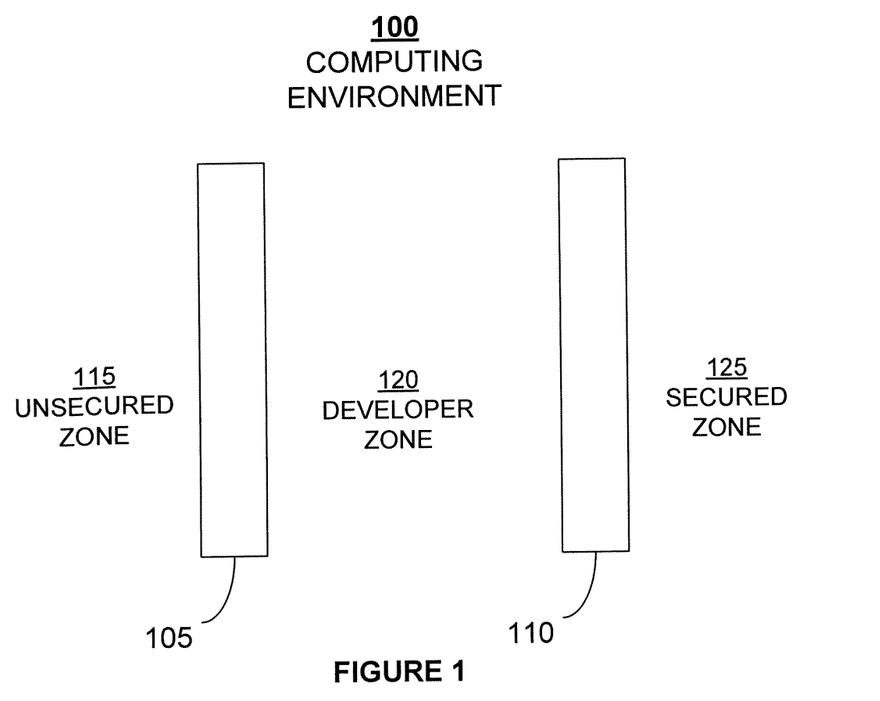
FIG. 1 is a diagram illustrating a computing environment with a developer zone.

FIG. 1 is a diagram illustrating computing environment 100 using a developer zone. Computing environment 100 has secured zone 125. Secured zone 125 is established to protect sensitive and confidential data that, if released or exposed, may be injurious to the organization, including its employees and clients. Some of this data may include source code, client identification, financial account information, and general data that the organization may not want exposed outside of secure zone 125. Secure zone 125 is protected from outside communication by firewall 110. The organization may open specific and known communication ports within firewall 110 to allow computing devices in secured zone 125 to communicate with known or unknown computing devices outside of secured zone 125.

Also shown is unsecured zone 115. Although unsecured zone 115 may in fact be a secured zone for another organization, because of the desire not to expose any sensitive data in secure zone 125, unsecured zone 115 may be assumed to be fully unsecured, i.e. the assumption of a worst-case scenario. By assuming and preparing for a worst-case scenario, i.e. that unsecured zone 115 is, in fact, unsecured, a consistent framework for computing environment 100 may be realized. Further, by assuming and preparing for a worst-case scenario, rules for communicating within computing environment 100 may be established that are not use-specific but apply to all communications. This may simplify the implementation of computing environment 100 as well as reduce the possibility that a system communicating from unsecured zone 115 may erroneously receive a less secure treatment. Thus, to attempt to avoid unintentional or malicious entrances into secured zone 125 by a computing device in unsecured zone 115, devices within unsecured zone 115 may be treated as unsecured regardless of any actual security in unsecured zone 115.

As discussed previously, organizations are using third-party resources, e.g. outsourcing, to develop application packages for use by the organization. To develop a package, a developer would likely need the most current version of the application running on the organization's systems. But, as discussed above, if the developer were allowed to work on systems in secured zone 125, which may be the actual versions of packages in use, there exists a potential for a security breach where sensitive information may be exposed. But if the developer were allowed to only work isolated in unsecured zone 115, the developer may not be able to develop a package that will work properly on the organization's systems. For one, the version created may not contain the desired new features or upgrades. Secondly, the feasibility of the package may not be able to be determinable before loading it into systems in secured zone 125 because testing may have been performed using systems that may not be running the current versions.

To provide developers with the computing resources necessary to develop and test packages while providing for the security of secured zone 125, developer zone 120 is provided. Developer zone 120 acts in a similar manner to a buffer between secured zone 125 and unsecured zone 115. Developer zone 120 contains copies of code or information contained in systems in secured zone 125 desirable for a specific developer to perform their duties. Developers are allowed to work within developer zone 120 with access to copies of portions of the current software being used by the organization but are not allowed to directly access working systems within secured zone 125. The organization establishes developer zone 120 and determines the content available for use by developers working within developer zone 120. Thus, the organization has some level of control over who may access developer zone 120 and what content developers within that zone has access to. Further, the organization maintains a degree of separation between running systems.

Figure 2:
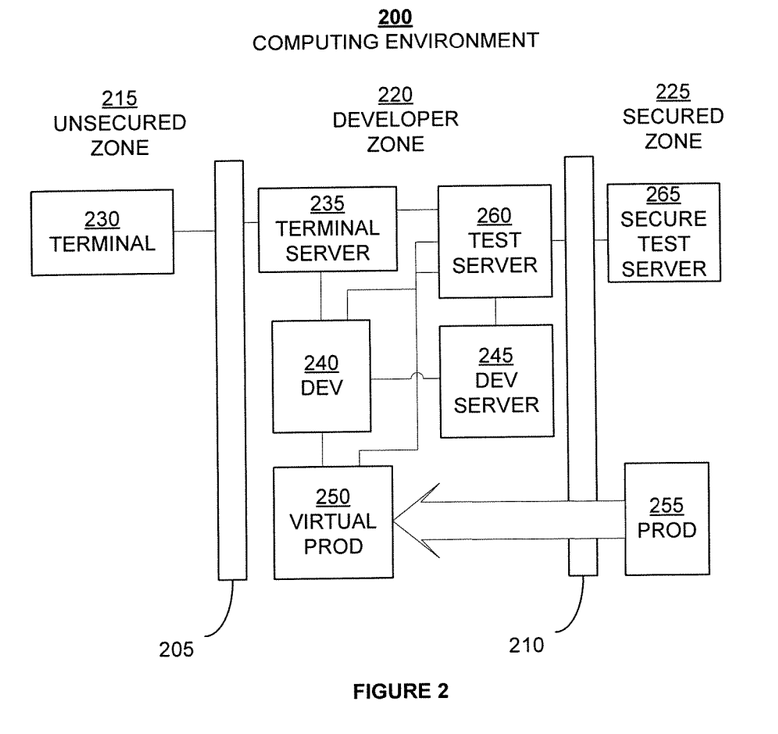
FIG. 2 is a diagram illustrating an exemplary developer zone.

FIG. 2 is a diagram illustrating an exemplary developer zone. Computing environment 200 has unsecured zone 215, secured zone 225 and developer zone 220. An organization controls the flow of information into and out of developer zone 220 by using firewall 205 and 210. Firewall 205 controls the flow of information between developer zone 220 and unsecured zone 215. Firewall 210 controls the flow of information between developer zone 220 and secured zone 225. Thus, a controlled buffer zone, developer zone 220, has been established between unsecured zone 215 and secured zone 225.

One of the purposes of developer zone 220 is to allow developers access to relevant and current information to develop packages for the organization. The following is an exemplary and non-limiting way in which a developer may have access to information within developer zone 220. A developer will have terminal 230 to develop packages. Terminal 230 will be allowed access through firewall 205 to terminal server 235. Terminal server 235 will preferably be in communication with one or more resources located within developer zone 220, described below. Thus, in one exemplary and non-limiting aspect, a developer will have access only to the display of terminal server 235 and the terminal server will only accept input from developer terminal 230. In that manner, the developer will essentially be able to develop packages by working in a restricted manner in developer zone 220.

Now that restricted and controlled access has been given to a developer through the use of terminal server 235, an organization determines what information that developer has access to. It is preferable not to allow a developer to develop packages on production systems for security reasons. It may also be preferable not to allow access to maintain the production systems working. It may be possible for a developer to unwittingly upload code or run tests that may crash the production systems or at least cause erroneous functioning of the systems. Thus, to protect sensitive information while still providing developers with the information necessary, the organization will populate developer zone 220 with copies of information.

In one exemplary and non-limiting aspect, the organization will copy necessary portions of information from production unit 255 inside secured zone 225 to virtual production unit 250 located in developer zone 220. In one exemplary and non-limiting aspect, the copying of information from production unit 255 to virtual production unit 250 may be controlled entirely from the organization in control of production unit 255. In one exemplary and non-limiting aspect, the flow of information from production unit 255 to virtual production unit may only occur if the organization "pushes" the information into developer zone 220. The push may occur as a result of a request by the developer, but preferably, a developer or any other outside resource will not be able to "pull," or cause the copying of, information from secured zone 225 into developer zone 220 without the control of the organization.

Once information is copied onto virtual production unit 250, a developer may have access to various resources to develop a package. In one exemplary and non-limiting aspect, development server 245 is provided and accessed by the developer via development environment 240. Because access to an organization's servers may require root or superuser access, it may be preferable not to allow the developer or any software developed access to passwords for those servers. Thus, in one exemplary and non-limiting aspect, development environment 240 is provided to give the developer access to root functionality to develop packages without being given passwords to access that functionality.

More specifically, in this exemplary and non-limiting example, development environment 240 may require an outside resource to login to use development server 245. The login provides a credential check before developer can access server 245. This credential check first determines if access can be granted to a requested server, and then if access can be granted, assigns specific granted access. The determination may also include whether or not additional security measures should be invoked such as key-stroke logging. Additionally, the developer's access to certain development server 245 functions may have been restricted. Thus, the login may be one manner in which to set up development server 245 for the particular developer. The login takes place of the login to gain root or superuser access. Thus, while a developer may have access to some or all the root actions available in development server 245, the developer may not be able to perform specific and protected root actions because the developer will preferably not have access to the root password.

When a developer develops a package through the use of development environment 240 before it is tested by systems in secured zone 225, a developer may want to test the package in developer zone 220. Thus, test server 260 is provided. Test server 260 is a copy of secured zone 225 secure test server 265. Thus, a developer will preferably be able to test a package in an environment that closely matches the actual testing environment.

Figure 3:
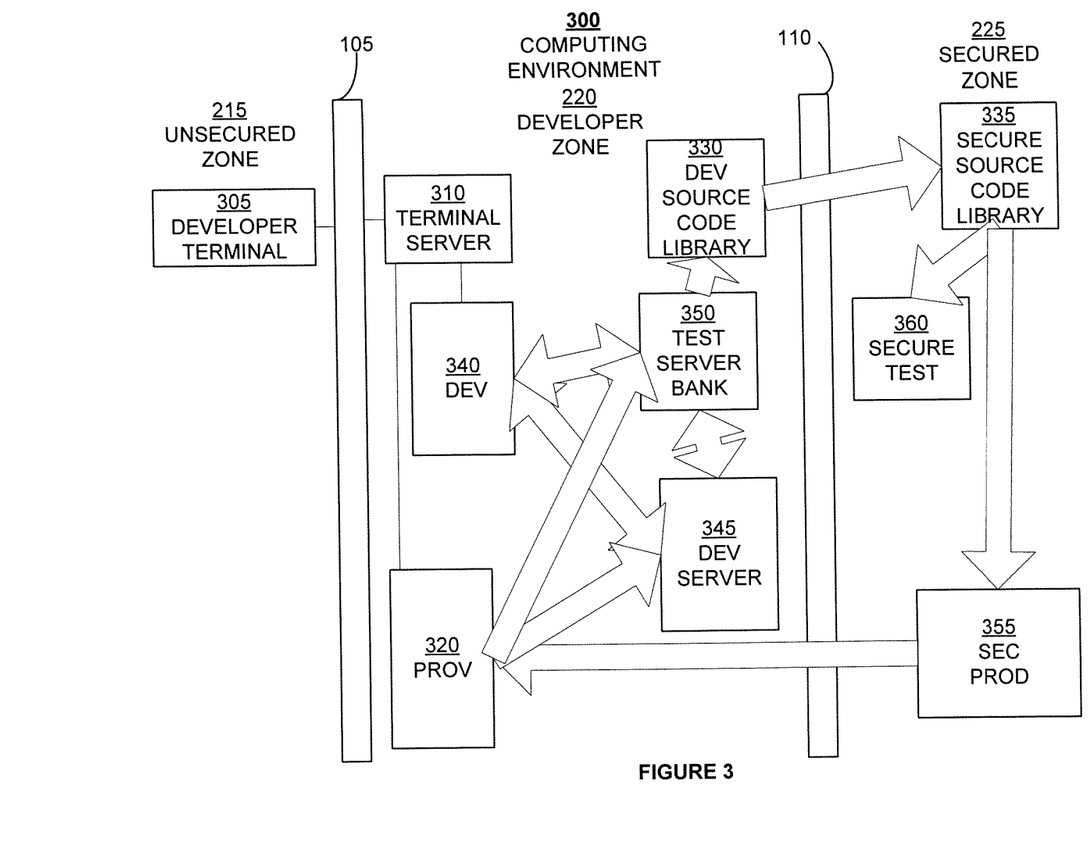
FIG. 3 is a diagram illustrating an exemplary communication flow path in a developer zone.

To establish secured zone 225, the flow of information both into and out of secured zone 225 should be controlled. Thus, communication pathways should be established that not only permit a developer to develop software packages for use, but also, limit the flow of information into and out of the secured zone. FIG. 3 is an exemplary and non-limiting aspect showing illustrative communication pathways. Computing environment 300 has unsecured zone 215, developer zone 220 and secured zone 225. Firewall 105 manages communication between developer zone 220 and unsecured zone 215. Firewall 110 manages communication between developer zone 220 and secured zone 225.

As discussed above, the level of access granted a developer in the developer zone may be limited depending upon the configuration of the system. FIG. 3 illustrates an exemplary and non-limiting example of providing a developer with various levels of root access depending upon the zone as well as the particular computing environment within the zone.

Referring to FIG. 3, a developer will log into developer zone 220 via developer terminal 305. Developer terminal 305 is in communication with terminal server 310, which is in communication with components in developer zone 220. Provisioning environment 320 has the current packages used to build development environment 340, development server 345, as well as test server bank 350. The current packages are copied from secured production environment 355 located in secured zone 225. Using development environment 340 supported by development server 345, a developer preferably is able to develop a package for testing.

To reduce the probability that a package uploaded into secure systems for testing will expose sensitive information, test server bank 350 is provided to the developer. Once a package has been tested successfully on test server bank 350, the developer will upload the developed code into developer source code library 330. Library 330 acts as a storage for developed source code until the organization systems are ready to take on the source code for additional testing. As with prior aspects, this provides another level of control. The organization controls what and when source code may be copied into secured zone 225. This uploading represents the only manner in which a developer may cause code developed in developer zone 220 to be introduced into secured zone 225. An organization may upload several protocols in library 330 to test for vicious or nefarious content prior to bringing the code into secured zone 225.

Once an organization has determined that it is ready to continue testing of the developed package, the developed code will be copied into secure source code library 335. The code will then be loaded into secured testing environment 360 for further testing. Once testing has been completed, the developed code will be copied from library 335 to secured production environment 355. It should be noted that the development of packages may take iterations of code developed, which may involve copying and recopying of information.

Figure 4:
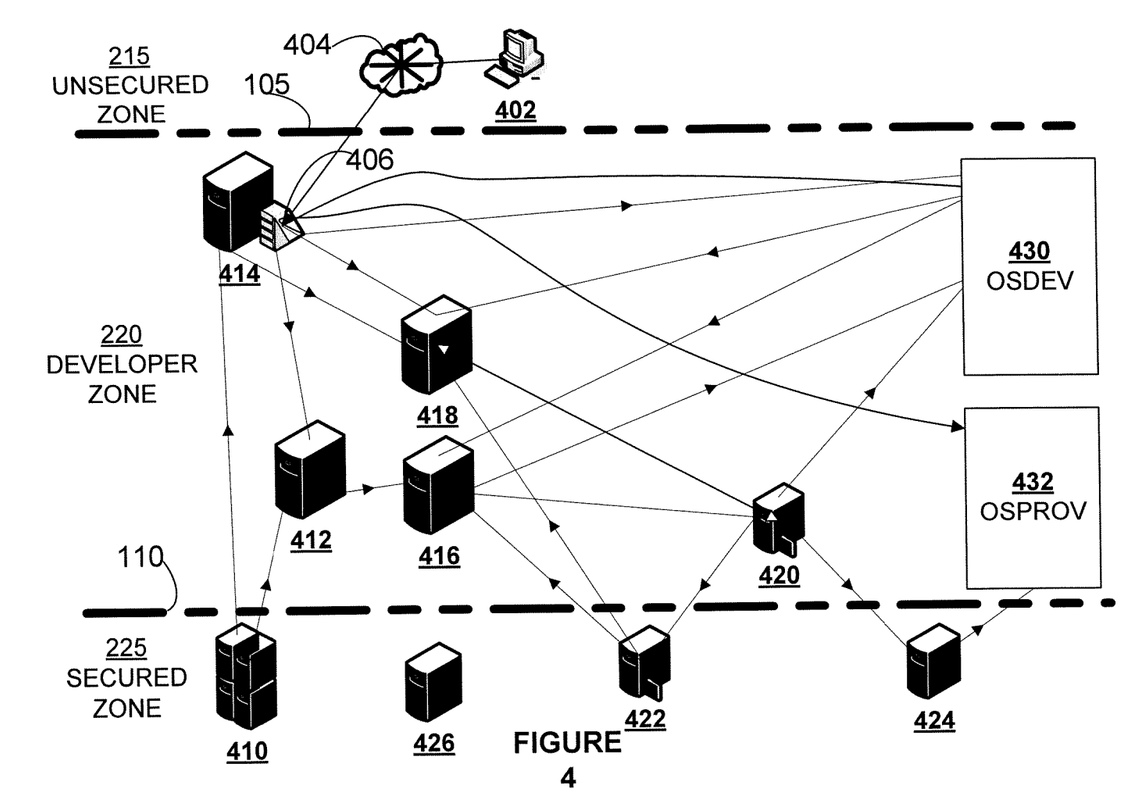
FIG. 4 is a diagram illustrating an exemplary system architecture in a developer zone.

As previously mentioned, an organization may wish to limit flow of information into and out of the developer zone as well as limit access to resources while in the developer zone. FIG. 4 is an exemplary and non-limiting example of a developer zone architecture in which computing resources have various access levels and communication flow paths are controlled. As with the prior figures, FIG. 4 has three zones: unsecured zone 215 in which the developer's computing resources operate; secured zone 225 in which the organization's computing resources operate; and developer zone 220 in which a developer operating in unsecured zone 215 may have limited access to certain resources necessary to develop a software package. Access to resources within secured zone 225 is limited by firewall 110 and firewall 105. Access to resources within developer zone 220 is limited by firewall 105.

As discussed above, to provide a developer access to resources to develop a software package for the organization, the organization may use developer zone 220. Developer zone 220 is preferably an instance specific computing environment created to allow outside developers to develop software packages using computing environment configurations and software versions that are relevant and preferably identical to the current computing environment in use by the organization. Developer zone 220 is preferably instance specific because the environment that is established should be relevant to the environment that the software package being developed for. Further, the environment preferably only reflects the portion of the computing environment of the software package being developed. In that manner, a developer accessing developer zone 220 will preferably only have access to resources the developer needs but does not have access to information about other resources the developer does not need access to.

Developer zone 220 may be established at any time prior to the developer accessing resources within developer zone 220. In one exemplary and non-limiting example, upon an organization indicating that a particular developer will be used, the organization may create developer zone 220. Thus, a developer using terminal 402 operating in unsecured zone 215 may be granted access, via network 404, to terminal server 406 through a port opened in firewall 105 by the organization. In one exemplary and non-limiting example, communication between terminal 402 and developer zone 220 is limited to terminal server 406. In other words, terminal 402 preferably does not communicate directly with any other computing resource located in developer zone 220 or secured zone 225. Further, in one exemplary and non-limiting example, the communication sent from terminal server 406 to terminal 402 is limited to a graphical representation.

Once a developer has access to terminal server 406, it is necessary to provide certain controlled resources to the developer so that the developer may build a software package. In one exemplary and non-limiting example, one of the resources may be source code that the developer needs to build the package. Thus, because a developer does not have access to resources, e.g. source code, within secured zone 225, the organization will need to populate developer zone 220 with source code, e.g. "drop" the source code into developer zone 220. Preferably, the source code "dropped" into developer zone 220 will only contain the portions of source code necessary for the developer to build a software package. For example, if a developer is building a software package for a check scanning portion of a banking application, it may be preferable to drop only the scanning portion of the source code, and any other code necessary for development and testing, rather than the entire application. Alternatively, it may be difficult to pick out the relevant portions of the source code. In that example, it may be preferable and more economical for the entire application source code to be dropped.

Further, it may be preferable to limit the "dropping" of the source code so that the organization controls the drop, i.e. a push operation controlled by the organization rather than a pull operation controlled by the developer. By limiting the drop procedure to a push operating, the organization controls the dissemination of the code. As discussed below, there may be multiple development zones with multiple developers requesting source code drops. If the dropping of the source code into the various development zones is not controlled, the organization may lose control over the code, thus possibly causing the previously secured source code to become unsecured. To prevent the loss of control, preferably source code is only dropped into a developer zone upon the receipt of a request and approval of the request by the organization.

The source code dropped into developer zone 220 will preferably be a copy of the current production source code in use, stored on source code library server 422, the copying of which is managed by customer server 410. Because the source code may be various languages, it may be necessary to drop the source code into various types of servers configured to work within the source code language. This is illustrated in FIG. 4 as Windows drop point server 414 and Linux drop point server 412. As discussed above, because passwords and other computing information may be available to the developer if the developer is provided user access, Linux drop point server 412 may be configured to run a powerbroker system, i.e. root access is prevented and the developer is only granted a high level of access.

The communication pathway between customer server 410 and servers 412,414 is one way from server 410 to servers 412,414. This provides for the copying of current and relevant source code from server 410 while preferably preventing the copying of potentially malicious or untested source code from developer zone 220 to server 410, thus obviating potentially catastrophic failure of an organization's secured resources due to the copying of the potentially malicious or untested source code into the secured zone 225 resources.

Once the copy of the source code has been dropped into developer zone 220, the developer will need an environment to build the software package as well as an environment to test the software package. To provide the developer with preferably the most relevant production environment in use by the organization, production environment server 424 uploads current production information to outside provisioning environment ("OSPROV") 432. Several different resources may be contained within OSPROV 432, an exemplary and non-limiting illustration is provided for in FIG. 5 below. Once OSPROV 432 has information containing the current production environment, the information is copied onto package build and test servers 418 for the Windows software package and/or 416 for a Linux software package. As described above, because server 412 may be using a powerbroker system to limit root access by a developer, build and test server 416 may also be implementing the powerbroker system in conjunction with server 412.

The developer will preferably use servers 418 and/or 416 to build and test source code while leaving the information contained within OSPROV 432 intact. This is to allow the developer a degree of freedom and flexibility to develop a software package on one server while maintaining a "clean" version of the production environment on another server. Therefore, the developer can built and test and possibly create a system failure in server 418 and/or 416 and quickly recover by resetting the system with the clean information from server 418.

Once a developer builds a software package, the software package will preferably be tested prior to copying the newly built software package into secured zone 225. Testing will preferably determine the viability of the software package, determine a level of performance, as well as prevent the introduction of potentially malicious source code into secured zone 225. The newly built software package is loaded onto server 420. The newly built software package is migrated into OSDEV 430. OSDEV 430 operates in a similar manner as OSPROV 432 in that OSDEV 430 provides a clean version of the testing environment. Several different resources may be contained within OSDEV 430, an exemplary and non-limiting illustration is provided for in FIG. 5 below.

A software package that has been built and tested is copied into the respective servers in secured zone 225. The software package is loaded into the production environment of secured zone 225 at production server 424 as well as source code library server 422. The organization may wish to perform further testing on the software package and copy the software package onto secured testing server 426 instead of directly copying the software package into production.

Figure 5:
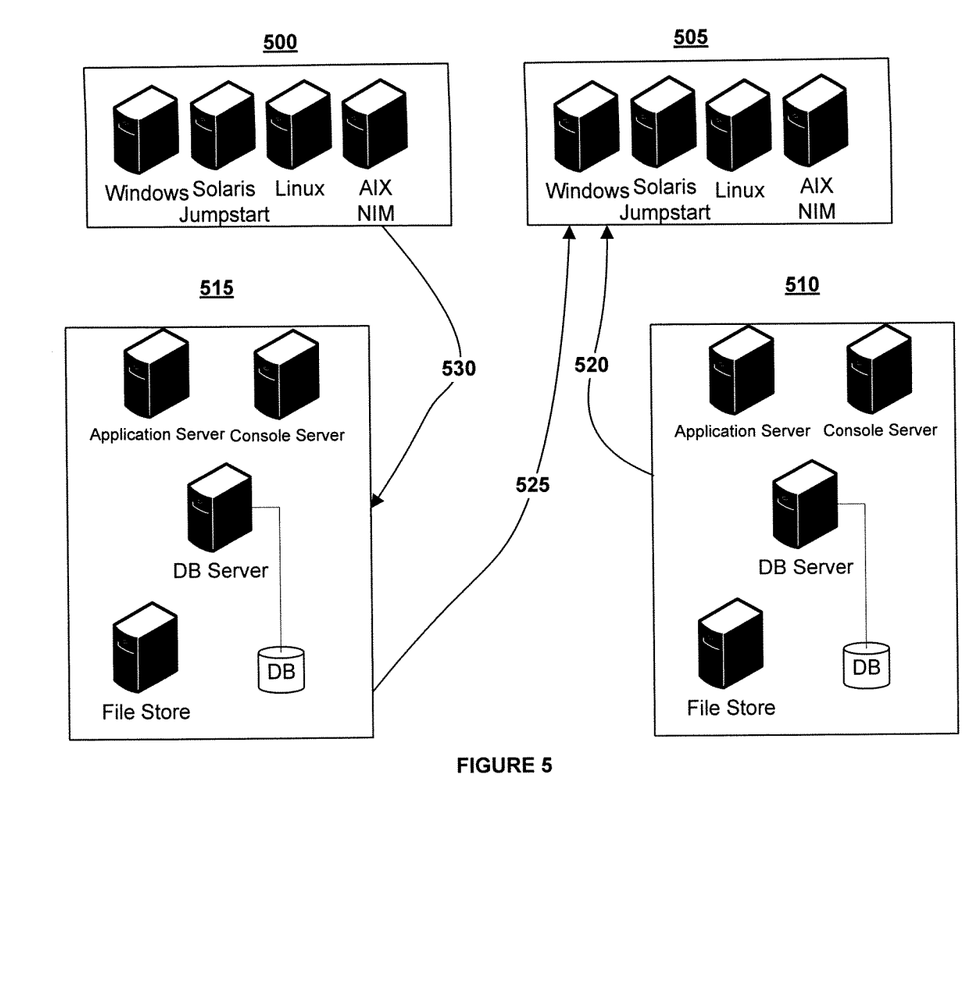
FIG. 5 is a diagram illustrating an exemplary provisioning and development environment.

As discussed above, OSPROV and OSDEV provide clean environments in which to reset the testing and build platforms, if necessary. FIG. 5 is a diagram illustrating an exemplary and non-limiting example of the architecture of OSPROV 510 and OSDEV 515 as well as the interaction with the build and test servers described above. Shown are build environment 500 and test environment 505. As discussed above, build environment 500 and test environment 505 are used by the developer to build the software package and at the appropriate time test the software package. Because a software package may be developed for one or more types of source code languages, environment 500 and environment 505 may have several types of servers, such as, but not limited to, Windows, Solaris Jumpstart, Linux, and AIX NIM.

OSPROV 510 is used to build test environment 505, as shown by communication pathway 520. OSPROV 510, as well as OSDEV 515, may have several supporting systems, including, but not limited to, an application server, a console server, a database server supported by a database, and a file store. A developer will preferably migrate built software packages from environment 500 into OSDEV 515 for storage, as shown by communication pathway 530, and will test the software packages on environment 505, as shown by communication pathway 525.

Figure 6:
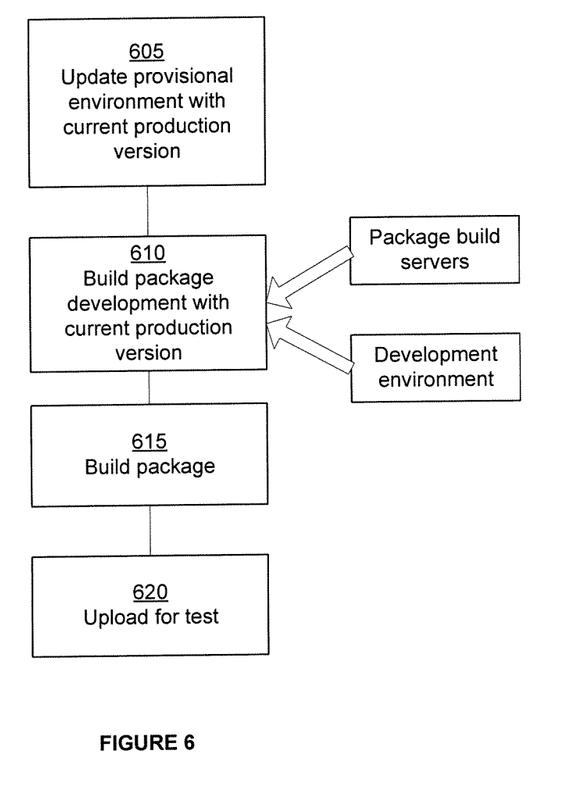
FIG. 6 is a flowchart illustrating the building of a package in a developer zone.

FIG. 6 is an exemplary and non-limiting way in which developers develop a package in a developer zone. At step 605, the provisional environment in the developer zone is updated with the current production version of the software to be developed. Once the provisional environment is updated, at step 610, the development environment is established, which includes creating or updating package build, testing, and development servers. At step 615, the developer will create a package for the organization and upload that package into the testing environment for testing at step 620.

Figure 7:
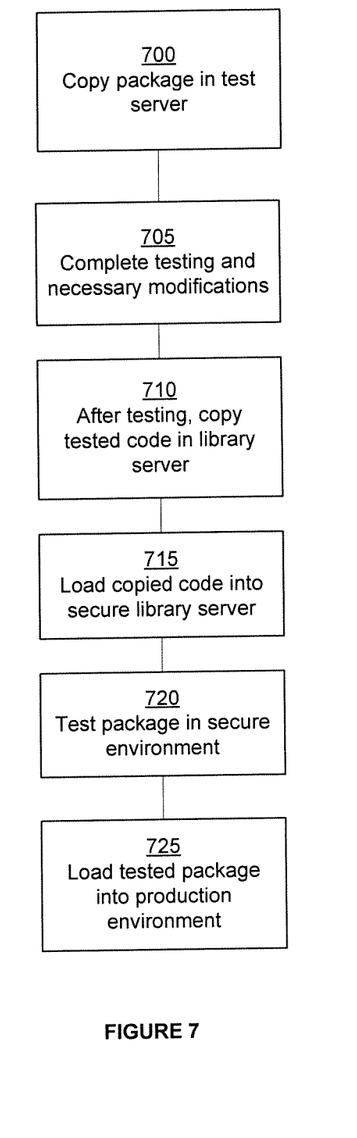
FIG. 7 is a flowchart illustrating testing and uploading a package into a secure environment.

To load for testing, in FIG. 7, the package is preferably copied into the testing server at step 700. Once testing and modification has been completed at step 705, the developed code is copied into developer library at step 710 and subsequently, upon direction by the organization, into secured library at step 715. The package is tested in the secured environment at step 720 and, upon completion of the testing, is loaded into the production environment at step 725.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device, and at least one output device. One or more programs are preferably implemented in a high-level procedural or object-oriented programming language to communicate with a computer system. However, the program(s) can be implemented in assembly or machine language, if desired. In any case, the language may be a compiled or interpreted language and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder, or the like, the machine becomes an apparatus for practicing the present disclosure. When implemented on a general-purpose processor, the program code combines with the processor to provide a unique apparatus that operates to perform the processing of the disclosed embodiments.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment but rather should be construed in breadth and scope in accordance with the appended claims.

What is claimed:

1. A non-transitory computer-readable medium comprising computer-readable instructions for providing a software package development environment, the computer-readable instructions storing instructions to:
   receive a data request from a developer at an unsecured computing device within an unsecured zone;
   initialize a provisional computing device within a developer zone;
   initialize a development computing device within the developer zone;
   copy the data from a secured production computing device within a secured zone to the provisional computing device within the developer zone;
   determine a level of access to write and test for the developer to the data copied to the provisional computing device within the developer zone; and
   copy a subset of the data that the developer has access to write and test, determined by the level of access of the developer, from the provisional computing device to the development computing device, both within the developer zone.

2. The non-transitory computer-readable medium of claim 1, further comprising instructions to:
   establish a communication link for transferring data between a development testing computing device and a secured testing computing device.

3. The non-transitory computer-readable medium of claim 2, further comprising instructions to:
   develop a software package;
   test the software package; and
   copy the software package to the secured testing computing device.

4. The computer-readable medium of claim 2 wherein the data is transferred only from the development testing computing device to the secured testing computing device.

5. The non-transitory computer-readable medium of claim 2, further comprising instructions to establish a communication link for transferring data between the secured testing computing device and the secured production computing device.

6. The non-transitory computer-readable medium of claim 2, further comprising instructions to:
   initialize at least one testing support server for supporting the development testing computing device.

7. The non-transitory computer-readable medium of claim 1, further comprising instructions to:
   initialize at least one development support server for supporting the development computing device.

8. A non-transitory computer-readable medium comprising computer-readable instructions for developing a software package, the computer-readable instructions storing instructions to:
   copy data from a secured computing device within a secured zone to a provisional computing device within a developer zone;
   initialize a development computing device within the developer zone;
   determine a level of access to write and test for a developer within an unsecured zone to the data copied to the provisional computing device within the developer zone; and
   load, in response to determining the level of access to write and test for the developer, a portion of the copied data from the provisional computing device to the development computing device, both within the developer zone, wherein the software package is developed on the development computing device within the developer zone and the portion of the copied data is the portion of the copied data that corresponds to the level of access to write and test for the developer.

9. The non-transitory computer-readable medium of claim 8, further comprising instructions to:
- copy the developed software package to a development test server; and
- test the developed software package on the development test server.

10. The non-transitory computer-readable medium of claim 9, further comprising instructions to:
- copy the tested packaged to a secure testing computing device; and
- test the copied packaged on the secured testing computing device.

11. The non-transitory computer-readable medium of claim 8, further comprising instructions to:
- copy the developed software package to the secured computing device.

12. The non-transitory computer-readable medium of claim 8, wherein the instructions to initialize a development computing device further comprise instructions to:
- initialize at least one server to support the development computing device.

13. The non-transitory computer-readable medium of claim 8, wherein the instructions to copy data from a secured computing device to a provisional computing device further comprise instructions to:
- send a command to the secured computing device to copy data;
- verify the data to be copied; and
- send the verified data to the provisional computing device.

14. The non-transitory computer-readable medium of claim 13, wherein the instructions to send a command to the secured computing device further comprise instructions to:
- initialize a terminal server in a development zone;
- log into the terminal server; and
- establish a communication link between the terminal server and the secured computing device.

15. A non-transitory computer-readable medium comprising computer-readable instructions providing for a developer using a remote terminal operating in an unsecured zone to access secured data to develop a software package, the computer-readable instructions storing instructions to:
- logs into a terminal server operating in a developer zone via the remote terminal;
- determines a level of access to write and test for a developer within the unsecured zone that logs into the terminal server within the developer zone; and
- requests via the terminal server that a copy of at least a portion of the secured data stored in a secured computing system within a secured zone be loaded onto a development computing device within the developer zone, wherein the portion of the secured data is first copied onto a provisional computing device within the developer zone and then loaded onto the development computing device within the developer zone and the portion of the secured data is the portion of the secured data that corresponds to the level of access to write and test for the developer.

16. The non-transitory computer-readable medium of claim 15, further comprising instructions to:
- request that the provisional computing device initiate a development environment within the developer zone comprising:
- at least one development server configured to receive input from the developer to develop the software package;
- at least one test server configured to test the developed software package; and
- at least one production server configured to simulate a production environment.

17. The non-transitory computer-readable medium of claim 16, further comprising instructions to:
- log into the development environment.

18. The non-transitory computer-readable medium of claim 15, further comprising instructions to:
- provide a development testing environment;
- test the developed software on the development testing environment; and
- notify the secured computing system that the developed software has been tested.

19. The non-transitory computer-readable medium of claim 15, further comprising instructions to:
- develop the software package using the copy of the secured data;
- notify the secured computing system that the software package is developed; and
- request that a copy of the developed software package be send to the secured computing system.

20. The non-transitory computer-readable medium of claim 19, further comprising instructions to:
- copy the developed software package into a developer library storage;
- notify the secured computing system that the developer library storage has a copy of the developed software package; and
- send the copy of the developed software package to a secured library storage.

21. The non-transitory computer-readable medium of claim 20, further comprising instructions to:
- send a copy of the developed software package from the secured library storage to a secured computing testing system;
- test the developed software package; and
- if the test is satisfactory, then load the tested software package into the secured computing system.

* * * * *